United States Patent [19]

Fischer

[11] 4,185,438

[45] Jan. 29, 1980

[54] ELEMENT FOR AND A METHOD OF MOUNTING AN OBJECT TO A SUPPORT STRUCTURE

[76] Inventor: Artur Fischer, Weinhalde 34, D-7244 Waldachtal 3 (Tumlingen), Fed. Rep. of Germany

[21] Appl. No.: 947,704

[22] Filed: Sep. 29, 1978

[30] Foreign Application Priority Data

Oct. 8, 1977 [DE] Fed. Rep. of Germany ....... 2745438

[51] Int. Cl.² ............................................. F16B 13/04
[52] U.S. Cl. ...................................... 52/704; 52/743; 85/63; 405/260
[58] Field of Search .................. 52/704, 743; 405/260, 405/261; 85/63, 67

[56] References Cited

U.S. PATENT DOCUMENTS

| 3,204,416 | 9/1965 | Williams | 52/743 X |
| 3,618,326 | 10/1969 | Montgomery | 405/261 |
| 4,026,184 | 5/1975 | Sozzi | 85/63 |
| 4,094,054 | 6/1978 | Fischer | 52/704 X |

*Primary Examiner*—Ernest R. Purser
*Attorney, Agent, or Firm*—Michael J. Striker

[57] ABSTRACT

A mounting element for mounting an object to a support structure provided with a mounting hole, has a leading anchoring portion of a diverging cross-section and a trailing mounting portion. The anchoring portion is inserted into the hole and anchored therein by a hardenable binding material. A separating element subdivides the hole into at least two chambers spaced from one another in a transverse direction. Thereby, the hardenable binding material after being hardened in the hole, forms two separate rigid bodies which spread apart from one another by the diverging anchoring portion when a force is applied to the mounting element. The separating element may be formed by two wing-like blade members arranged on a circumferential surface of the anchoring portion.

21 Claims, 2 Drawing Figures

ELEMENT FOR AND A METHOD OF MOUNTING AN OBJECT TO A SUPPORT STRUCTURE

BACKGROUND OF THE INVENTION

The present invention relates to a mounting element for and a method of mounting an object to a support structure, such as masonry or the like.

It is known to provide a mounting element having a mounting portion for mounting an object thereon, and an anchoring portion arranged to be received into a mounting hole of the support structure and to be anchored in the latter by a hardenable binding material which is introduced into the hole. It is also known to provide a ring member which closes an annular gap between the mounting element and the wall of the mounting hole and has a filling opening for injecting the hardenable binding material into the mounting hole.

In order to anchor the mounting element, a mounting hole having a diameter corresponding to that of the ring member is drilled in the support structure. Thereupon, the mounting element together with the ring member fitted thereon, is pressed into the hole. Thereby, the annular gap which is formed between the mounting element and the wall of the mounting hole is closed. At the same time, the mounting element is centered in the mounting hole and is fixed in the centered position by the ring member. Then, the mounting hole is filled by the hardenable binding material by introducing the latter through the filling opening of the ring member. The needed holding force is attained by the interengagement resulting from the filling of unevennesses of the mounting hole, on the one hand, and by arresting means provided on the mounting element, such as grooves, notches, projections or the like, on the other hand.

However, when the wall of the mounting hole is smooth, the volumetric contraction of the binding material is insignificant and therefore the friction between the hardened core of the binding material and the wall of the mounting hole can be low, whereby the holding force is substantially small. In order to avoid this, it has been proposed to make the mounting hole of a cross-section increasing toward the bottom thereof. It is understood that the process of drilling such holes requires special drilling devices. However, such drilling devices are not always available at working sites. On the other hand, the drilling of the undercut mounting holes in hard support structures encounters significant difficulties.

SUMMARY OF THE INVENTION

Accordingly, it is an object of the present invention to provide a mounting element for a method of mounting an object to a support structure, which avoid the disadvantages of the prior art.

More particularly, it is an object of the present invention to provide such a mounting element for and a method of mounting an object to a support structure, in accordance with which the mounting element can be firmly anchored in a cylindrical mounting hole with increased friction between the core of hardenable bonding material and the wall of the mounting hole, as compared with the prior art.

In keeping with these objects and with others which will become apparent hereinafter, one feature of the present invention is that the mounting element having an anchoring portion of a cross-section increasing towards its leading end, and a mounting portion, is provided with means associated with the anchoring portion and operative for subdividing a mounting hole into at least two chambers. The method of mounting in accordance with the invention includes the respective step of subdividing the mounting hole into two chambers. In such a case, a hardenable binding material admitted into the mounting hole is hardened in the thus-formed two chambers and therefore forms two substantially rigid bodies. When the mounting element is loaded as a result of mounting an object thereon, the anchoring portion having the cross-section increasing toward the leading end, e.g., a wedge-shaped configuration, applies a force which has a component directed towards the wall of the mounting hole. This component urges the thus-formed bodies of the hardened binding material to spread apart from one another and to firmly abut against the wall of the mounting hole so that, the holding capacity resulting from interengagement of the mounting element with the wall of the mounting hole is increased by wedge-like clamping of the mounting element in the hole. Since by the above-mentioned clamping the volumetric contraction of the hardenable binding material is also equalized, the process of hardening which is utilized in accordance with the present invention provides for very high holding capacity also in the cases when the mounting element is anchored in cylindrical holes.

Another feature of the present invention is that the separating means may be formed as wing-like blade members arranged on the outer circumferential surface of the anchoring portion. They may extend from the outer circumferential surface of the mounting element up to the inner circumferential surface of the wall of the mounting hole. The blade members are elongated and extend lengthwise of the anchoring portion. They may be located in a plane extending through an axis of the anchoring portion.

Still another feature of the present invention is that the blade members forming the separating means are provided with perforations. When the mounting hole is subdivided into two completely separated chambers, it is necessary to provide two filling openings in a ring member fixing the mounting element in the hole and to inject the binding material into the chambers separately through these openings. It is, however, possible to drill a deeper mounting hole so that in the region of the hole bottom the chambers separated by the blade members communicate with one another, which makes possible the filling of the chambers by one step. The additional perforations provided in the blade members facilitates the full filling of the chambers by one step. Even when the binding material in hardened condition has low elasticity, the connection of the rigid bodies by portions of material extending through the perforations insignificantly affect or does not affect at all the spreading apart of the bodies, inasmuch as the connecting portions extending through the perforations have a small cross-section and are readily torn off.

A further feature of the present invention is embodied in that the blade members may be connected with one another at their leading ends so as to form a forked blade element. This embodiment is utilized especially when the blade members are not of one piece with the mounting element, but are separate parts. The blade members may be connected with one another by a web from which the blade members extend toward the trailing end of the anchoring portion to thereby form prongs of the above-mentioned forked blade element.

A still further feature of the present invention is that the blade element formed by two blade members may be fixed to the anchoring portion of the mounting element. This may be performed by providing a pin at the leading end of the blade element, the pin being engaged into a hole provided at the leading end of the anchoring portion. The above-mentioned fixation may also be attained by a ring member urging the blade members into engagement with the anchoring portion, or by other means. when the mounting element is so constructed, the insertion of the mounting element together with the blade members is simplified, on the one hand, and the blade members are correctly positioned relative to one another and to the anchoring portion so as to avoid nonuniform subdivision of the mounting hole, on the other hand.

An additional feature of the present invention is that a disc member is provided at the loaction wherein the blade members are connected with one another at their trailing ends, the disc member having a diameter corresponding to the diameter of the mounting hole. The disc member prevents the filling of the bottom portion of the mounting hole, which otherwise can cause formation of such a bulky and nonelastic web that the latter firmly connects the bodies formed in the chambers and cannot be torn off.

Finally, the blade members together with the web connecting them with one another, may together form an injection-molded integral member constituted by a synthetic plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
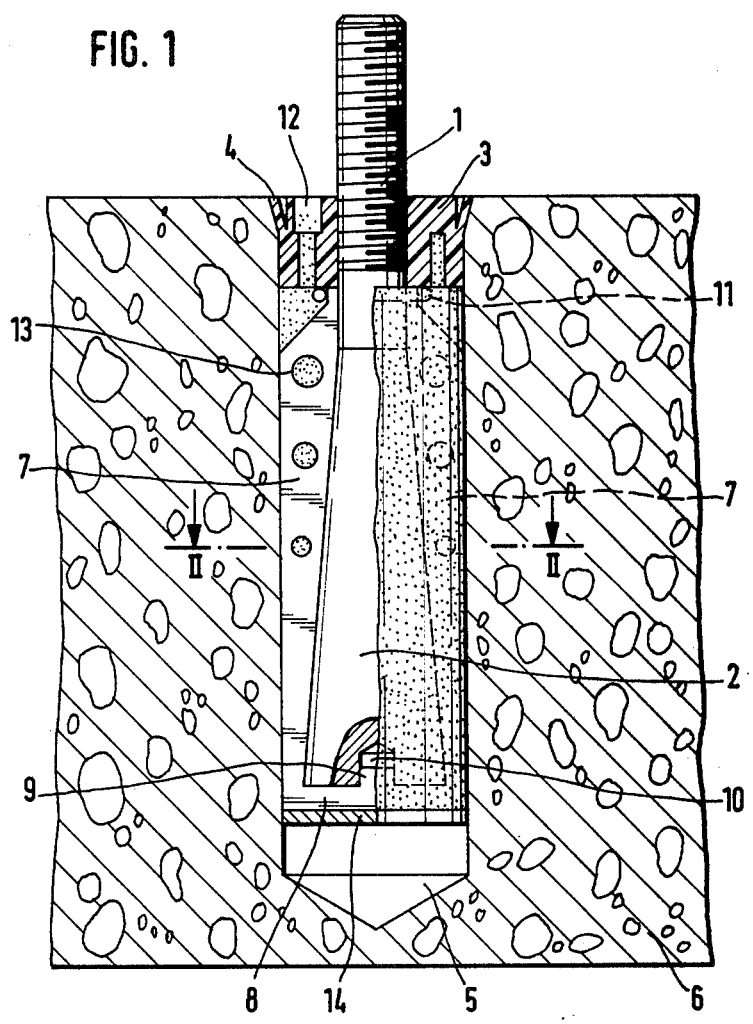
FIG. 1 is a view showing a partially sectioned mounting element in accordance with the present invention, inserted into a mounting hole of a support structure.
Figure 2:
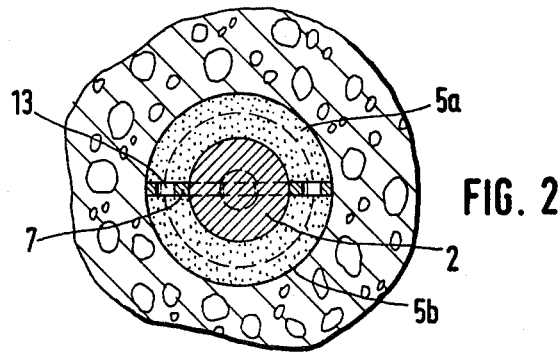
FIG. 2 is a plan view of the parts shown in FIG. 1.

A mounting element in accordance with the present invention has a threaded mounting portion 1 and an anchoring portion 2. The anchoring portion 2 or a section thereof has a cross-section which increases towards a leading end of the anchoring portion, e.g., toward a bottom of a mounting hole 5 provided in a support structure 6. A ring member 3 is arranged substantially at a trailing end of the anchoring portion 2 and closes an annular gap which is formed between an outer circumferential surface of the mounting element and the inner circumferential surface of the mounting hole 5. The ring member 3 is provided with resilient sealing lips 4. The ring member 3 serves to firmly fix the mounting element in the mounting hole 5 and to prevent backflow of a hardenable binding material from the mounting hole 5. The ring member 3 has a filling opening 12.

At least two wing-like blade members 7 are arranged on the anchoring portion 2 of the mounting element. They extend lengthwise of the anchoring portion 2. Preferably, they are located in a plane extending through an axis of the anchoring portion and extend in an axial direction. The blade members 7 subdivide the mounting hole 5 into two chambers. In order to completely separate the chambers from one another the blade members 7 extend from the outer circumferential surface of the anchoring portion 2 up to the inner circumferential surface of the mounting hole 5. The blade members are connected with one another at their leading ends by a web 8 extending in a direction substantially transverse to the axis.

The blade members 7 may be of one piece with the anchoring portion 2. However, they also may be formed as separate members. In the latter case, fixing means is provided for fixing the blade members to the anchoring portion 2. This means includes a pin 9 arranged on the connecting web 8 and engaged in a hole 10 formed in the anchoring portion 2. Furthermore, the free ends of the blade members 7 are retained on the anchoring portion 2 by a spring ring 11. As can be seen from the drawing, the blade members 7 and the web 8 together form an integral forked element which can be constituted by a synthetic plastic material and manufactured by an injection-molding process. The blade members 7 are provided with a plurality of perforations 13.

The anchoring of the mounting element in the mounting hole 5 of the support structure is performed in the following manner. The mounting element together with the ring member 3 is inserted into the mounting hole. A device for injecting of a hardenable binding material is set on the filling opening 12 of the ring member 3, directly or with interposition of an intermediate feeding part. The chambers 5a and 5b which are formed by subdividing of the mounting hole 5 by the blade members 7 are fully filled by the hardenable material, which filling is facilitated by the perforations 13 provided in the blade members 7. After hardening the binding material in the chambers 5a and 5b separated by the blade members 7, a substantially rigid core is formed composed of two rigid bodies each accommodated in a respective one of the chambers 5a and 5b. The bodies are shaped as segments. When the mounting element is loaded by an object mounted on the mounting portion 1, a pulling force is applied to the anchoring portion 2. Since the latter has the cross-section increasing in the direction towards its leading end, the pulling force has a component directed toward the wall of the mounting hole 5. This component urges the bodies formed in the chambers 5a and 5b into firm abutment against the walls of the mounting hole 5 of the support structure 6. Therefore, the holding force which is generated by the interengagement resulting from the injection of the binding material into the mounting hole is additionally increased by the wedge-like clamping of the spread-apart bodies.

When the mounting hole has a significant depth, the binding material in the region of the bottom of the mounting hole can form a bulky connecting web which firmly connects the rigid bodies with one another and hinders their spreading apart by the anchoring portion. In order to avoid the formation of such a bulky and nondestructable connecting web, a disc member 14 is arranged at an end face of the web 8 connecting the blade members 7 with each other. The disc member 14 has a diameter which corresponds to the diameter of the mounting hole 5.

It will be understood that each of the elements described above, or two or more together, may also find a useful application in other types of constructions differing from the types described above.

While the invention has been illustrated and described as embodied in a mounting element for and a method of mounting an object to a support structure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A mounting element for mounting an object to a support structure provided with a mounting hole having an axis, comprising a leading anchoring portion arranged to be received into the mounting hole of the support structure and to be anchored therein by introducing a hardenable binding material into the mounting hole, said anchoring portion having leading and trailing ends and a cross-section increasing in the direction toward said leading end; a trailing mounting portion connected with said anchoring portion at said trailing end and arranged to extend outwardly beyond the mounting hole so as to mount an object thereon; and separating means associated with said anchoring portion to subdivide the mounting hole into at least two chambers spaced from one another in a direction transverse to the axis of the mounting hole, whereby the hardenable binding material, after being hardened in the chambers of the thus-divided mounting hole forms at least two substantially rigid bodies which spread apart from one another by said anchoring portion when a force is applied to the mounting element.

2. A mounting element as defined in claim 1, wherein said mounting hole is bounded by a wall having an inner circumferential surface and a predetermined diameter, said mounting portion having an outer circumferential surface of a diameter which is smaller than the diameter of the circumferential surface of the wall of the mounting hole so that an annular gap is formed between the former and the latter; and further comprising a ring member fitted on said mounting portion and arranged to be inserted into said annular gap so as to substantially close the same and to fix said mounting portion in the trailing end section of the mounting hole, said ring member being provided with a filling opening through which the hardenable binding material is introduced into the mounting hole.

3. A mounting element as defined in claim 1, wherein said anchoring portion has an outer circumferential surface, said separating means including at least two elongated wing-like blade members arranged on said outer circumferential surface of said anchoring portion and extending lengthwise of the latter.

4. A mounting element as defined in claim 3, wherein said anchoring portion has an axis, said blade members extending in an axial direction of said anchoring portion.

5. A mounting element as defined in claim 3, wherein the mounting hole has a wall having an inner circumferential surface, said outer circumferential surface of said mounting portion being radially inwardly spaced from the inner circumferential surface of the wall of the mounting hole, said blade members extending from said outer circumferential surface of the anchoring portion up to the inner circumferential surface of the wall of the mounting hole.

6. A mounting element as defined in claim 3, wherein said blade members also extend in a direction transverse to an axial direction so that the thus-formed substantially rigid bodies are segments.

7. A mounting element as defined in claim 3, wherein said anchoring portion has an axis, said blade members being located in a plane extending through said axis of said anchoring portion.

8. A mounting element as defined in claim 3, wherein said blade members are provided with perforations whereby said chambers formed by said blade members communicate with one another.

9. A mounting element as defined in claim 3, wherein said blade members have leading ends and are connected with one another at said leading ends; and further comprising means for connecting said blade members with one another.

10. A mounting element as defined in claim 9, wherein said blade members are connected with one another so as to form together a forked blade element.

11. A mounting element as defined in claim 10, wherein said connecting means includes a web section which connects said blade members at said leading ends thereof and from which said blade members extend toward said trailing end of said anchoring portion so as to form prongs of said forked blade element.

12. A mounting element as defined in claim 3, wherein said blade members are connected with one another and together form a blade element, said blade element being fixed to said anchoring portion; and further comprising means for fixing said blade element to said anchoring portion.

13. A mounting element as defined in claim 12, wherein said blade element and said anchoring portion have leading and trailing ends, said fixing means being arranged at at least one of said ends of said blade element and said anchoring portion.

14. A mounting element as defined in claim 12, wherein said blade element is a first part and said anchoring portion is a second part, said fixing means including a hole provided in one of said parts, and a pin provided on the other part and engageable into said hole.

15. A mounting element as defined in claim 12, wherein said connecting means includes a spring ring fitted on said blade members and urging the latter into engagement with said anchoring portion.

16. A mounting element as defined in claim 12, wherein said blade element has a trailing end at which said blade members are connected with one another; and further comprising a disc member arranged at said trailing end of said blade element and having a diameter corresponding to that of the mounting hole.

17. A mounting element as defined in claim 11, wherein said forked element including said blade members and said web section is an integral member.

18. A mounting element as defined in claim 17, wherein said integral member is an injection-molded member constituted by a synthetic plastic material.

19. A mounting element as defined in claim 3, wherein said blade members are separate members connected with said anchoring portion.

20. A mounting element as defined in claim 3, wherein said blade members are of one-piece with said anchoring portion.

21. A method of mounting an object to a support structure having a mounting hole, comprising the steps of providing a mounting element having a leading anchoring portion with a cross-section increasing toward a leading end of the anchoring portion, and a trailing mounting portion connected with the anchoring portion at a trailing end thereof; inserting the mounting element into the mounting hole of the support structure so that the anchoring portion is accommodated in the mounting hole whereas the mounting portion extends outwardly beyond the latter; subdividing the mounting hole into at least two chambers spaced from one another in a direction transverse to the axis of the mounting hole; and introducing into the mounting hole a hardenable binding material so that the material in hardened condition forms in the chambers of the thus subdivided mounting hole at least two substantially rigid bodies which spread apart from one another by said anchoring portion when a force is applied to the mounting element.

* * * * *